United States Patent [19]

Bevilacqua

[11] 4,004,154
[45] Jan. 18, 1977

[54] FISSIONABLE MASS STORAGE DEVICE

[75] Inventor: Frank Bevilacqua, Windsor, Conn.

[73] Assignee: Combustion Engineering, Inc., Windsor, Conn.

[22] Filed: Mar. 17, 1975

[21] Appl. No.: 558,767

[52] U.S. Cl. .............................. 250/518; 250/506; 250/507

[51] Int. Cl.² ..................... G21F 3/00; G21C 11/00

[58] Field of Search .......... 250/506, 515, 518, 507

[56] References Cited

UNITED STATES PATENTS

| | | | |
|---|---|---|---|
| 3,037,120 | 5/1962 | McDaniels, Jr. ................... | 250/506 |
| 3,119,933 | 1/1964 | Allen ................................ | 250/507 |
| 3,229,096 | 1/1966 | Bonilla et al. ..................... | 250/507 |
| 3,230,373 | 1/1966 | Montgomery .................. | 250/506 X |
| 3,823,065 | 7/1974 | Jones ............................ | 250/506 X |
| 3,845,315 | 10/1974 | Blum ............................ | 250/518 X |
| 3,859,533 | 1/1975 | Suvanto ........................ | 250/518 X |

Primary Examiner—Archie R. Borchelt
Attorney, Agent, or Firm—Stephen L. Borst

[57] ABSTRACT

An apparatus for the safe storage of a plurality of fissionable masses including an array of discrete neutron absorbing shields which utilizes the principle of the neutron trap to reduce the multiplication factor of the storage array to a subcritical value when immersed in a neutron moderating medium. Each discrete neutron absorbing shield is designed to perimetrically encircle each of the stored fissionable masses. Each shield is spaced such that the encircled fissionable mass is spaced from the next adjacent neutron absorbing shield by a distance determined by the enrichment of the fissionable masses and attenuation of the moderating medium.

6 Claims, 3 Drawing Figures

FISSIONABLE MASS STORAGE DEVICE

BACKGROUND OF THE INVENTION

The present invention relates to the safe storage of fissionable masses. More particularly the present invention relates to a seismicly safe arrangement for storing fissionable masses under water with a maximum storage density without producing a critical geometry.

DESCRIPTION OF THE PRIOR ART

It is well-known to store fissionable masses such as nuclear reactor fuel element assemblies in storage pools which can accommodate either new fuel assemblies or spent fuel assemblies. An essential requirement for all fissionable material storage is that the fissionable material cannot be permitted to assume a geometry which is either critical or supercritical. Accordingly, most if not all storage pools have devices and mechanisms for preventing the placing of fissionable masses in such positions that they achieve a critical geometry. An example of such a prior art storage arrangement is disclosed in the U.S. Pat. No. 3,037,120 issued to J. D. McDaniels, Jr. on May 29, 1962. However, most prior art fuel storage devices have the disadvantages of occupying large amounts of space in the nuclear power plant and of failing to adequately meet the current Atomic Energy Commission seismic criteria.

FIG. 1 illustrates one such prior art nuclear reactor fuel storage arrangement. The nuclear fuel assemblies are placed in chambers 110. Chambers 110 are bounded on one pair of opposite sides by plates 112 and 112' and on the other pair of opposite sides by plates 114 and 114'. As can be seen from the drawing, a plurality of adjacent chambers 110 share common side plates 112 and 112'. Each plurality of adjacent chambers 110 which share common side plates 112 and 112' are spaced from the next plurality of adjacent chambers which also share their own common side plates 113 and 113' by space 120. The space 120 is maintained by spacing elements 122 and 122' which are located at the extreme lateral ends of plates 112' and 113. In a similar manner adjacent plates 114 and 114' are held apart by spacing elements 116 and 116' to establish a separation space 118.

As above described, the prior art fissionable mass storage arrangement includes spaces 118 and 120 which separate the storage compartments 110 by a predetermined distance $d$. Accordingly, if the distance $d$ is properly chosen, the walls 114, 114', 112, 112', 113 and 113' of each chamber 110 in cooperation with the spaces 118 and 120 operate as neutron flux traps: a concept that will be discussed below. However, this prior art apparatus has the fundamental deficiency that it cannot easily meet the seismic criteria established by the AEC. It is apparent from FIG. 1 that on the occurrence of a seismic disturbance, one entire module, including all of the adjacent storage areas 110 which are located between the two steel plates 112 and 112', can move as a unit. This being the case, the unit as a whole, when filled with stored fissionable masses, could conceivably be distorted so that the separation distance of space 120 is reduced. In such a case, storage array may become a critical or supercritical mass since all that is required to obtain a critical mass is the displacement of only one of the fuel assemblies from its design position.

SUMMARY OF THE INVENTION

Thus is posed the problem of finding an apparatus which permits the compact storage of fissionable masses without creating the possibility of producing a critical geometry. The solution to the posed problem should be such that the storage arrangement becomes simpler, less dangerous and more compact than prior art devices. It is also desirable that the storage arrangement be easily fabricated and easily modified to contain fuel at different enrichments. These objects are realized by the present invention through a design which incorporates discrete neutron absorbing shields adapted to perimetrically encircle each of the fissionable masses. Spacing means in at least two directions are provided for spacing each of the discrete neutron absorbing shields from the next adjacent discrete nuclear absorbing shield by at least a predetermined distance which is determined by the enrichment of the fissionable mass. For the purposes of this application, this distance is designated the "neutron attenuation distance". The apparatus is submerged in a storage pool under a moderator, which is ordinarily water, and the neutron absorbing shields are open at each end so that the water may circulate through the interior of the shield and through the length of the contained fuel assembly, thereby assisting in the removal of excess heat. The apparatus further has the feature that each discrete neutron absorbing shield is flared at the upper end to facilitate the insertion of the fuel assembly into the shield. The preferred embodiment of the invention includes the arrangement of neutron absorbing shields in rows and columns such that open channels are created between the rows and columns.

The present invention may be better understood and its numerous objects and advantages may become apparent to those skilled in the art by reference to the accompanying drawing wherein like reference numerals refer to like elements in the several figures and in which FIG. 1 is an illustration to which represents the prior art; FIG. 2 is a isometric view of the invention; and FIG. 3 is an illustration of the invention in its actual practical application in a nuclear power plant storage pool.

DESCRIPTION OF THE PREFERRED EMBODIMENT

Recent decreases in the availability of spent fuel reprocessing plants have created a substantial demand for increased storage facilities. Accordingly, it is desirable to design a storage facility that is able to store a maximum number of fuel assemblies in a given volume. While there exists this demand to store fuel assemblies with a maximum storage density, an all important and overriding requirement is that the storage array must prevent the fissionable masses from achieving a physical geometry which allows the combined mass to become critical. This requirement must be met in all cases and at all costs and, therefore, the spent fuel storage apparatus must prevent the creation of a critical mass even on the occurrence of the most severe seismic disturbence. It should be recognized that only the inadvertent displacement of one fuel assembly is necessary to create a localized critical mass in the storage array. The following preferred embodiment is an apparatus which accomplishes the object of obtaining a maximum storage density while assuring that a critical mass is avoided in any area even on the occurrence of a severe earthquake.

Figure 3:
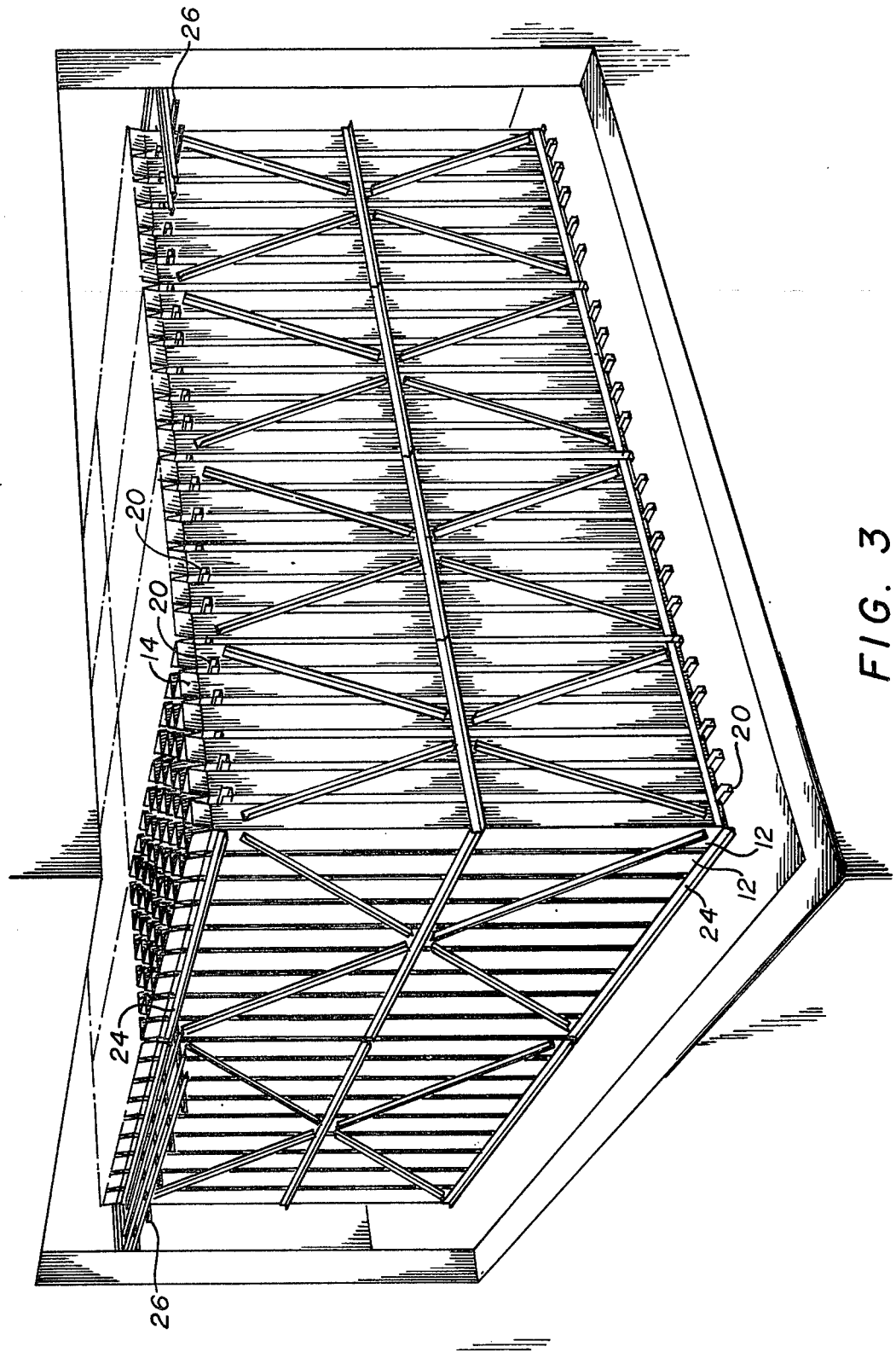

The present invention is generally illustrated in FIG. 3 which discloses a storage array for nuclear fuel assemblies under water in a fuel storage pool. Such storage pools are for the purpose of storing new nuclear reactor fuel or spent nuclear reactor fuel. Spent fuel is highly radioactive and generates considerable amounts of decay heat. Consequently, it is necessary to continuously cool the spent fuel in order to remove the decay heat. The usual means for dissipating the decay heat is to circulate water along the length of the fuel assembly thereby removing the heat through the mechanisms of conduction and convection. The heated water may subsequently be removed from the spent fuel storage pool and cooled in an external heat exchanger.

Figure 2:
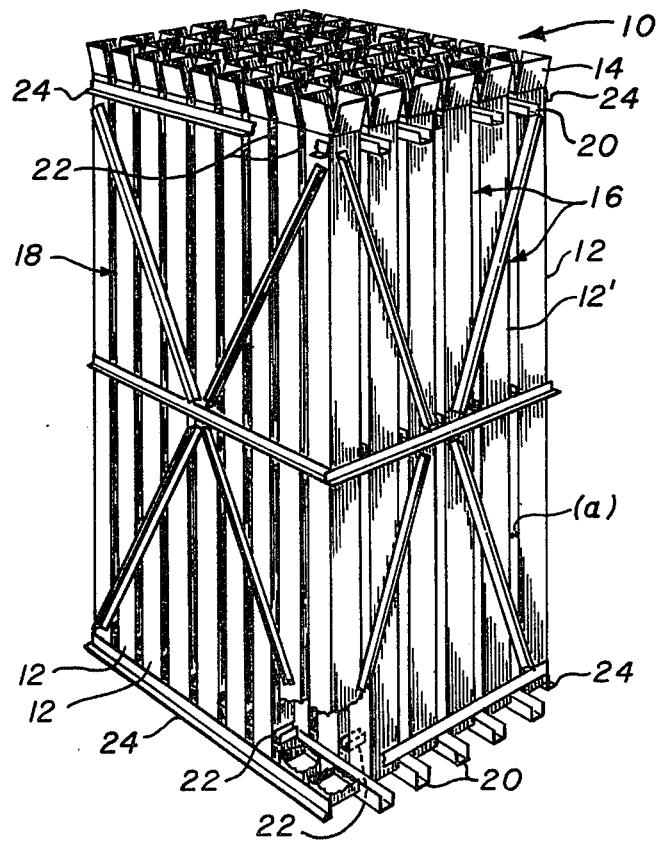

The fuel storage rack of the invention as illustrated in greater detail in FIG. 2 consists of a plurality of discrete neutron absorbing containers 12. In the preferred embodiment these containers 12 are rectangular, open ended boxes which closely fit the fuel assemblies to be stored. Each discrete neutron absorbing container 12 may be constructed by extruding a square metal tube of proper thickness or by welding two bent L-shaped elongated metal plates of proper thickness. The metal material is preferably one which has a relatively high neutron absorption cross-section such as stainless steel. Alternately it can be made of a material of low neutron absorption cross-section material to which is fastened or which includes a high cross-section material such as boron, cadmium or gadolinium. In this embodiment a square stainless steel container is used with a thickness ranging from .508 to 1.27 centimeters or with a preferred thickness of .635 centimeters. In order to facilitate the deposit of fuel assemblies in these discrete closely fitting containers, the walls of the containers are outwardly flared at one end. This flared portion 14 is illustrated in the diagram as being the upper portion of the box. However, it should be recognized that while the preferred orientation of the discrete neutron absorbing containers is up and down, it is nevertheless possible to construct a storage rack which has its storage containers in an orientation other than vertical.

In the preferred embodiment a multiplicity of the discrete neutron absorbing containers are arranged into an array of rows and columns so that there are spaces 16, 18 both between the rows and the columns. In this manner, the design of the preferred embodiment includes a neutron flux trap which permits the closer spacing of fissionable masses than would otherwise be possible. The separating means in one direction are extended U-channels 20 to which adjacent and opposite containers are welded. In the other direction, the adjacent containers are attached to U-channels 22 which may be abbreviated as shown in the illustration or may be full length. These spacing means, the extended U-channels 20 and the abbreviated U-channels 22 hold the discrete containers apart by at least a predetermined neutron attenutaion distance $a$. This minimum predetermined neutron attenuation distance $a$ is a distance which is precalculated to assure that the array of stored fuel assemblies cannot achieve a critical mass. While passing from one fuel assembly to the next adjacent fuel assembly the neutrons must pass sequentially through a very small water gap, a stainless steel plate which is one wall of the discrete neutron absorbing container 12, a gap 16 filled with a moderator such as water or borated water, and a second stainless steel plate, which is a portion of the next adjacent discrete neutron absorbing container 12' which surrounds the next adjacent fuel assembly. It is also possible that the neutron may be reflected in gap 16 and may return to the first steel plate of container 12. During its passage through these four mediums the typical neutron behaves as follows. On encountering the first stainless steel plate, the typical neutron is a "fast" neutron emanating from the fuel and has such a high energy that it passes through this first neutron absorbing material essentially unaffected and unabsorbed. During its passage through the adjacent water gap 16, the typical neutron is moderated by the water from its high energies to lower energies to become a "slow" or low energy neutron. And finally, upon encountering the second stainless steel plate or upon reencountering the first stainless steel plate after reflection in water gap 16, the neutron is absorbed, since the neutron has been moderated to an energy which permits the absorption of the neutron by the neutron absorbing material. It is essential to keep the "very small water gap" between the fuel assembly and its enclosing container to a minimum for two reasons: first, to minimize the possibility of the displacement of the enclosed fuel assembly from its preferred central position; and second, to avoid the situation in which the neutron is moderated to low energies and is subsequently reflected by either the water moderator or by the neutron absorbing material of the enclosing discrete container. It can be shown that increasing the width of the water gap immediately adjacent to the stored fuel assembly, increases the probability of this reflection which has the effect of increasing the reactivity of the array of stored fuel assemblies: an undesirable result. Accordingly, this interior gap should in no case be allowed to exceed 1.5 centimeters and the dimension of the gap 16 is calculated by assuming the interior gap to be zero.

Figure 1:
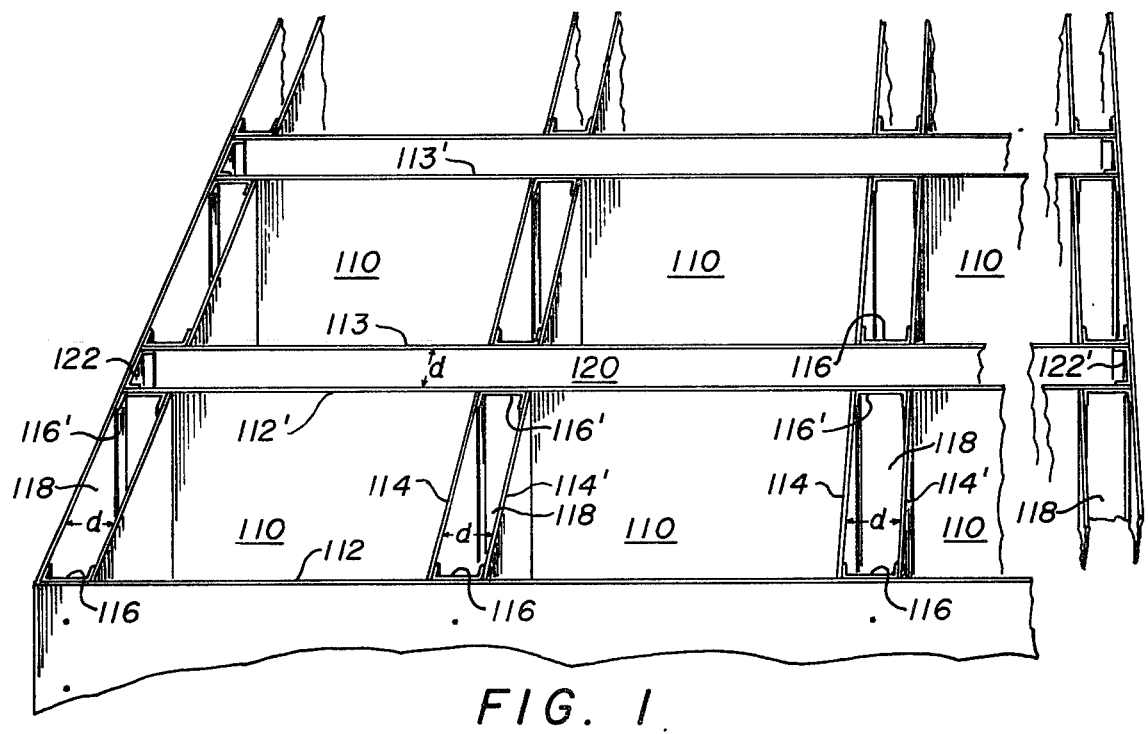

Accordingly, the arrangement of adjacent fuel assemblies surrounded by discrete neutron absorbing containers is a "neutron flux trap" in which any neutron which is traveling from one fuel assembly through a moderator to another fuel assembly or back to the original fuel assembly is sequentially exposed to a moderating material and the trapping material. It is primarily due to this flux trap principle utilized by the invention that the storage density of spent fuel assemblies can be substantially increased. The dimensions involved particularly the neutron attenuation distance through the water gap between adjacent discrete neutron absorbing containers, depends upon a number of factors, including the identity of the fissionable material, the fuel enrichment of the stored fuel assembly, and the thickness of the neutron absorbing material as well as the identity of the neutron absorbing material. For the purposes of this disclosure the predetermined neutron attenuation distance is defined as the distance between adjacent discrete neutron absorbing containers or the width of gap 16 as shown in FIG. 2. In the preferred embodiment the minimum predetermined neutron attenuation distance is 9.5 centimeters. In actual practice the prior art device illustrated in FIG. 1 and previously described ineffectively utilized the flux trap principle in that the separation distance built into the prior art device was small and the appropriate degree of neutron moderation was not obtained. The fuel storage apparatus of the present invention overcomes this difficulty by providing a neutron attenuation distance which is sufficient to allow the water gap and the neutron absorbing shields to act effectively as a neutron flux trap.

The present invention includes a multiplicity of individual discrete neutron absorbing shields which individually enclose each and every stored fuel assembly. Furthermore, the device of the present invention discloses an assemblage of fuel assemblies which meet the strict seismic criteria established by the Atomic Energy Commission. Contrary to the prior art which required the multiplicity of spent fuel assemblies which share the common walls 112 and 112' to oscillate together as one unit, the design of the present invention allows each individual stored fuel assembly to oscillate essentially independently of the others. Accordingly, the accumulated stresses and the permitted oscillation modes are substantially different in the present invention from the prior art storage racks. As described above, the discrete containers are spaced by U-shaped spacing members 20 and 22 at top and bottom positions. The preferred embodiment further assembles a multiplicity of storage containers into a rectangular unit 10 which has nine containers on one side and six containers across the end. Along the outside of this modular unit are attached angle irons 24 which facilitate the attachment of one modular unit to an adjacent unit by means of any well-known prior art device. In addition, it should be recognized that each container of the rectangular modular unit is held above the floor of the storage pool by a certain separation space which allows the entry and circulation of cooling fluid through the length of the storage container 12. Accordingly, relatively cool coolant enters through the bottom of the container, flows upwardly through the length of the stored fuel assembly and exits through the top of the fuel assembly and the storage container 12. Furthermore, the spacing means which assembles the storage containers into rows and columns permits the intermingling cross flow between the adjacent storage containers around the outside thereof.

The rectangular storage units 10 containing a multiplicity of storage containers are assembled by setting each unit 10 on the floor of the pool or by bolting each unit 10 to a support base on the floor of the storage pool, and bolting each adjacent rectangular unit 10 to the next adjacent rectangular unit as described above. Depending on the seismic restraint requirements, the rectangular units on the periphery of the storage array are not restrained at all, are butted against the sides of the storage pool, or are fixedly fastened to the walls by means of angle irons 26 as illustrated in FIG. 3. In the alternative, the separating U-channels may extend outwardly of the rectangular unit permitting the external attachment to the side spacing means. Also as an alternative or an additional feature that increases seismic resistance, additional spacing means may be provided between the adjacent containers midway of the length of the containers and/or diagonal spacers which diagonally traverse a number of containers in the same row or column.

What is claimed is:

1. An apparatus for the safe yet compact storage of a plurality of fissionable masses comprising:
   a. a plurality of adjacent discrete neutron absorbing open-ended shields disposed in side-by-side relationship, one of each of which is adapted to parametrically encircle one of each of said plurality of fissionable masses, said neutron absorbing shields consisting of stainless steel having a thickness in the range from .3 centimeters to 1.4 centimeters;
   b. spacing means in each of two directions for spacing each of said side-by-side neutron absorbing shields from the next adjacent neutron absorbing shield by a predetermined neutron attenuation distance of at least 9.5 centimeters; and
   c. hydrogenous moderating means between said adjacent discrete neutron absorbing shields for moderating neutrons which are emitted from said fissionable masses.

2. The apparatus as recited in claim 1 wherein said moderating means is water.

3. The apparatus as recited in claim 1 wherein said discrete neutron absorbing shields are flared at one end.

4. The apparatus as recited in claim 1 wherein said spacing means includes at least two spaced apart spacing means for each side of each of said neutron absorbing shields, one pair of spacing means being near one end of said neutron absorbing shields and the other pair of said spacing means being near the other end of said neutron absorbing shields.

5. An apparatus for the safe yet compact storage of a plurality of fissionable masses as recited in claim 1 wherein said predetermined neutron attenuation distance is a function of the fissile enrichment of said fissionable masses.

6. An apparatus for the safe yet compact storage of a plurality of fissionable masses as recited in claim 1 wherein said discrete neutron absorbing shields are stainless steel with a thickness of about .635 centimeters.

* * * * *